US010491952B2

(12) United States Patent
Hsu et al.

(10) Patent No.: US 10,491,952 B2
(45) Date of Patent: Nov. 26, 2019

(54) SCALABLE CALCULATION OF THE SIMILARITY CONTENT GRAPH (71) Applicant: The DIRECTV Group, Inc., El Segundo, CA (US)

(72) Inventors: Raymond Hsu, Irvine, CA (US); Ashok Sahu, Kirkland, WA (US)

(73) Assignee: The DirecTV Group, Inc., El Segundo, CA (US)

( * ) Notice: Subject to any disclaimer, the term of this patent is extended or adjusted under 35 U.S.C. 154(b) by 225 days.

(21) Appl. No.: 15/625,284

(22) Filed: Jun. 16, 2017

(65) Prior Publication Data

US 2018/0367856 A1 Dec. 20, 2018

(51) Int. Cl.
H04N 21/466 (2011.01)
H04N 21/482 (2011.01)
H04N 21/45 (2011.01)
G06F 7/08 (2006.01)

(52) U.S. Cl.
CPC ........... H04N 21/4668 (2013.01); G06F 7/08 (2013.01); H04N 21/4532 (2013.01); H04N 21/4826 (2013.01)

(58) Field of Classification Search
CPC .............................. H04N 21/4668; G06F 7/08
See application file for complete search history.

(56) References Cited

U.S. PATENT DOCUMENTS

| 8,289,328 | B2 | 10/2012 | Lee et al. | |
|---|---|---|---|---|
| 9,075,882 | B1* | 7/2015 | Ward | G06Q 30/0631 |
| 9,092,519 | B2 | 7/2015 | Khedouri et al. | |
| 9,152,300 | B2 | 10/2015 | Poniatowski | |
| 9,235,574 | B2 | 1/2016 | Green et al. | |
| 10,102,559 | B1* | 10/2018 | Jain | G06Q 30/0631 |
| 2003/0126600 | A1 | 7/2003 | Heuvelman | |
| 2003/0126601 | A1 | 7/2003 | Roberts et al. | |
| 2007/0078849 | A1* | 4/2007 | Slothouber | G06F 16/9535 |
| 2008/0134043 | A1 | 6/2008 | Georgis et al. | |
| 2011/0126230 | A1 | 5/2011 | Dow et al. | |
| 2012/0078952 | A1 | 3/2012 | Araya | |
| 2014/0006951 | A1 | 1/2014 | Hunter | |
| 2014/0223480 | A1* | 8/2014 | Berry | H04N 21/4668 725/40 |
| 2015/0073931 | A1* | 3/2015 | Ronen | G06Q 30/0631 705/26.7 |
| 2016/0012053 | A1* | 1/2016 | Weening | G06F 16/435 707/723 |
| 2016/0188725 | A1 | 6/2016 | Wang et al. | |
| 2016/0192006 | A1 | 6/2016 | Alfishawi et al. | |
| 2018/0150897 | A1* | 5/2018 | Wang | G06Q 30/0631 |

* cited by examiner

Primary Examiner — Jensen Hu
(74) Attorney, Agent, or Firm — BakerHostetler

(57) ABSTRACT

A method includes creating a base content set having attributes indicative of a first program. Selecting a second program to form a first recommendation set, determining a first similarity score between the base content set and the first recommendation set, and providing a recommendation based on the similarity score.

4 Claims, 8 Drawing Sheets

| Base Content Set | Title | Mood | | | Character | | | Theme | | |
|---|---|---|---|---|---|---|---|---|---|---|
| | How to Train Your Dragon | Charming | Moving | Thrilling | Viking | Dragon | Teen Boy | Quest | Transformation | Underdog |
| Recommendation Set | Epic | Positive | Endearing | Spirited | Teenager | Father | Queen | Adventure | Quest | Growing Up |
| Score | | | 0 | | | 0 | | | 0.33 | |
| | Inside Out | Amusing | Charming | | | Father | Young Girl | Growing Up | Adventure | Discovery |
| Score | | | 0.5 | | | 0 | | | 0 | |
| | How to Train Your Dragon 2 | Charming | Airy | Cheeky | Dragon | Viking | Dragon Rider | | | Transformation |
| Score | | | 0.33 | | | 0.66 | | | 1.0 | |

FIG 4

| Base Content Set | Title | Genre | | | UDF = 0.5 |
|---|---|---|---|---|---|
| 210 | | | | | |
| | How to Train Your Dragon | Animation | Fantasy | Kids & Family | |
| Recommendation Set 212a | Epic | Animation | | | 0.55 |
| Recommendation Set 212b | Inside Out | Animation | Fantasy | Kids | 0.82 |
| Recommendation Set 212c | How to Train Your Dragon 2 | Fantasy | Animation | Kids | 0.42 |

FIG 5

| Base Content Set | How to Train Your Dragon | Year (Sigma = 5) 2010 | Age Rec (Sigma = 1) 13 |
|---|---|---|---|
| Recommendation Set | Epic | 2013 | 13 |
| Score | | 0.69 | 1.0 |
| | Inside Out | 2015 | 12 |
| Score | | 0.36 | 0.36 |
| | How to Train Your Dragon 2 | 2014 | 12 |
| Score | | 0.53 | 0.36 |

FIG 6

| | Char Weight = 1 | Mood Weight = 1 | Theme Weight = 1 | Genre Weight = 1 | Age Weight = 1 | Year Weight = 1 | Score |
|---|---|---|---|---|---|---|---|
| How to Train Your Dragon — 410 | | | | | | | |
| Epic — 412 | 0.0 | 0.0 | 0.33 | 0.55 | 0.69 | 1 | 2.57 |
| Inside Out — 413 | 0.5 | 0.0 | 0.0 | 0.82 | 0.36 | .36 | 2.04 |
| How to Train Your Dragon 2 — 414 | 0.33 | 0.66 | 1.0 | 0.42 | 0.53 | .36 | 3.3 |

FIG 7

SCALABLE CALCULATION OF THE SIMILARITY CONTENT GRAPH

TECHNICAL FIELD

Embodiments of the present inventions relate to methods and systems for recommending content to customers, and more particularly, to methods and systems including a scalable algorithm for providing such recommendations.

BACKGROUND

At the foundation of most recommendation systems is a graph knowledge component which provides how content is intra directed and the weight given to each content. However, typically implementation of this feature utilizes a large and always available set of content that is relatively static. A content graph built from the similarity of their metadata is traditionally performed by a set-intersection algorithm. If the set size is N, each content will have a graph value list of N−1 and their associated weight. This graph can be used to build a list of similar content if given seed content. Thus, the calculation of this graph carries a high initial load, but decreases over time as new content is added and little, if any, content is deleted or otherwise made not available.

There is a need to develop systems and methods for a recommendation system that is useful for ever-changing content, much of which is available only during specific times of the day.

SUMMARY

The present disclosure is directed to a method including creating a base content set having attributes indicative of a first program, selecting a second program to form a first recommendation set, determining a first similarity score between the base content set and the first recommendation set, and providing a recommendation based on the similarity score. The method may further include selecting a third program to form a second recommendation set, determining a second similarity score between the base content set and the second recommendation set, and ranking the first recommendation set and the second recommendation set based on the first similarity score and the second similarity score. The determining step may include performing one of a non-sorted similarity function, a sorted categorical similarity function and a numerical similarity function or all of the foregoing, namely wherein the determining step includes performing all of a non-sorted similarity function to obtain a first interim similarity score, performing a sorted categorical similarity function to obtain a second interim similarity score, and performing a numerical similarity function to obtain a third interim similarity score and wherein the recommendation is based on one of the first interim similarity score, the second interim similarity score or the third interim similarity score. Each of the first interim similarity score, the second interim similarity score and the third interim similarity score may be assigned a weight and the recommendation may then be based on the weighted sum of the first interim similarity score, the second interim similarity score and the third interim similarity score. The method may further include selecting a third program to form a second recommendation set, determining a second similarity score between the base content set and the second recommendation set, and ranking the first recommendation set and the second recommendation set based on the first similarity score and the second similarity score and wherein the selecting step includes filtering upcoming program content based on criteria, appending attributes associated with the upcoming program content, and extracting the first recommendation set based on future program availability. The base content set may in part be derived from seed data obtained from a user profile. The base content set may be derived in part from a viewing history.

The present disclosure is also directed to an apparatus including an input-output interface, a processor coupled to the input-output interface and wherein the processor is coupled to a memory, the memory having stored thereon executable instructions that when executed by the processor cause the processor to effectuate operations including creating a base content set having attributes indicative of a first program, selecting a second program to form a first recommendation set, determining a first similarity score between the base content set and the first recommendation set, and providing a recommendation based on the similarity score. The operations further may further include selecting a third program to form a second recommendation set, determining a second similarity score between the base content set and the second recommendation set, and ranking the first recommendation set and the second recommendation set based on the first similarity score and the second similarity score. The determining step may include performing one of a non-sorted similarity function, a sorted categorical similarity function and a numerical similarity function or all of the above, namely, performing a non-sorted similarity function to obtain a first interim similarity score, performing a sorted categorical similarity function to obtain a second interim similarity score, and performing a numerical similarity function to obtain a third interim similarity score and wherein the recommendation is based on one of the first interim similarity score, the second interim similarity score or the third interim similarity score. Each of the first interim similarity score, the second interim similarity score and the third interim similarity score may be assigned a weight and the recommendation may then be based on the weighted sum of the first interim similarity score, the second interim similarity score and the third interim similarity score. The operations may further include selecting a third program to form a second recommendation set, determining a second similarity score between the base content set and the second recommendation set, and ranking the first recommendation set and the second recommendation set based on the first similarity score and the second similarity score. The selecting step may include filtering upcoming program content based on criteria, appending attributes associated with the upcoming program content, and extracting the first recommendation set based on future program availability.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings:

FIG. 3b is a further refinement of the exemplary process flow of FIG. 3a.

DETAILED DESCRIPTION OF ILLUSTRATIVE EMBODIMENTS

Overview.

The present disclosure may include systems and methods for a recommendation system that is dependent on ever-changing content, much of which is available only during specific times of the day. This requires the generation of similar content at much shorter intervals while being aware of available content. This disclosure describes the process of how a schedule aware content graph is generated based on a large dynamically changing content database. This disclosure provides the system and methods to provide not only recommendations to customers logging in to a server having preferences associated therewith, but also provides use cases which do not require a customer logon.

As will be discussed in more detail below, the process starts by ingesting the content database. Data sanitization is performed to reduce the processing burden downstream via processes such as filtering by genre, trivial content, and duplicates. This sanitized content set is now defined as the Base Content Set (BCS). The content metadata fields are then normalized so content for shows will be weighed greater for new content than shows no longer running. A recommendation set (RS) is created and comprised of content available in the near future or through other consumption channels. The two datasets, the BCS and the RS, are ingested by similarity functions which take as input categorical and numerical data.

Scalability issues are addressed by performing all similarity tasks in a map-reduce architecture, where each BCS is loaded to a mapper. The algorithmic approach for the fusion of the model outputs is a summation of weighted unit normalized measures. This results in a natural binning based on the number of available metadata available, and then sorting the outputs per bin which can then be further augmented through weighting. This compartmentalized approach decreases cognitive load on the analyst as the data and their influence can be immediately detected. The output is a graph of the BCS with weighted direction to RS, with the recommendations based on a ranking of the multiple RS in numerical order. Additionally, each of the interim functions may be used independent of the other functions to derive recommendations using less computational power.

System Environment.

Figure 1:
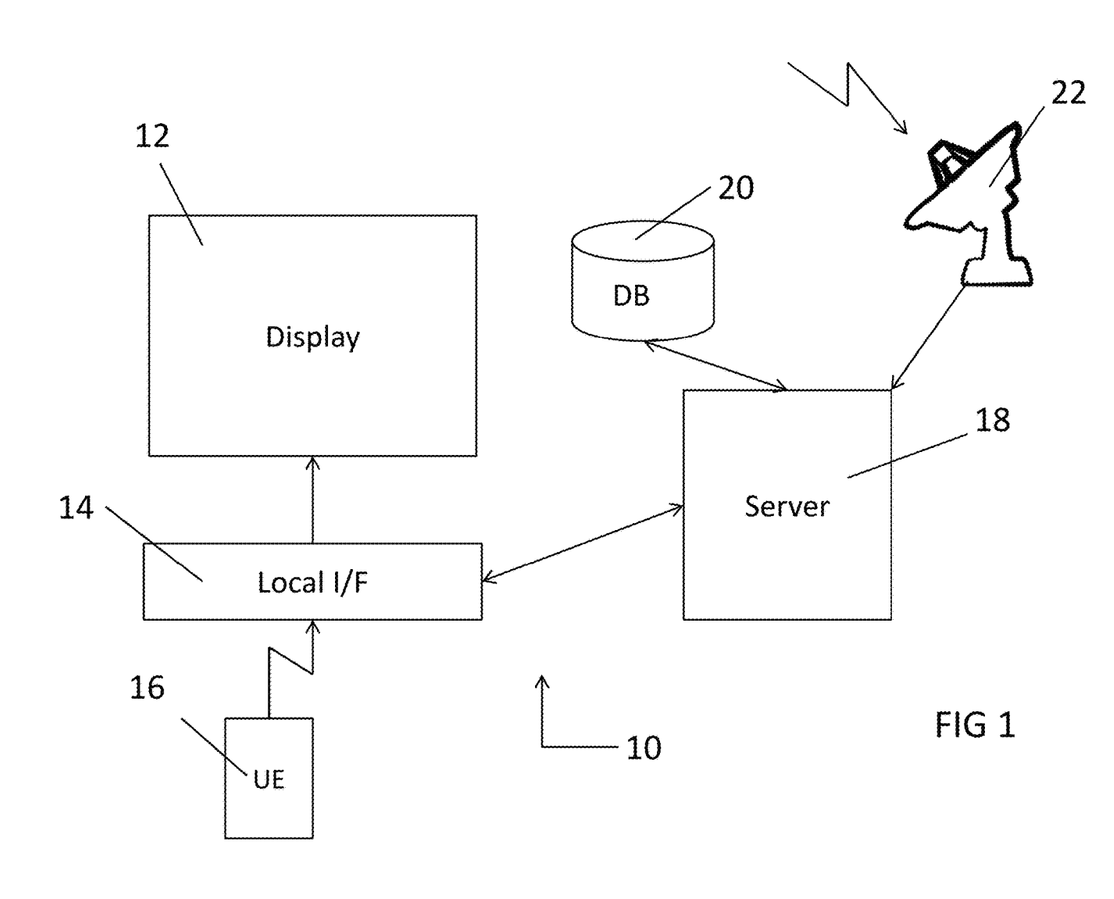
FIG. 1 is a schematic representation of an exemplary system environment in which the methods and systems to capture event data may be implemented.

Illustrated in FIG. 1 is a schematic representation of an exemplary system 10 environment in which embodiments of the present disclosure may operate. In the exemplary system 10, there is shown a television 12 as a video output of an entertainment system. While the television 12 is shown in an exemplary system, those skilled in the art will understand that the television 12 may be any type of video output, including but not limited to, video outputs associated with a tablet, smartphone, personal computer, LCD, or any other video output display. The television screen 12 is in communication with a set-top box ("STB") 14 which may be controlled by user equipment ("UE") 16 and which STB 14 may be in communication with server 18. It will be understood that STB 14 may contain a variety of functions controlled by and accessed by UE 16. Alternatively, the present disclosure does not require a STB 14 in order for system 10 to be operational and the UE 16 may be in direct communication with both television 12 and server 18.

The UE 16 may, for example, be a traditional remote control for a STB 14 having a proprietary operating system and application and physical interfaces particular to a manufacturer or service provider. Alternatively, UE 16 may be a smartphone, tablet or personal computer configured with an operating system which may, for example, be one of Apple's iOS, Google's Android, Microsoft Windows Mobile, or any other smartphone operating system or computer operating system or versions thereof. The UE 16 may control user input functions, including, but not limited to, selection and control of channel, movies, recordings, applications and other functions. The UE 16 may provide the ability for a user to input preference data, billing information, profile information, friends, likes and dislikes, or other inputs that enable or personalize the functions available to a user.

The UE 16 may have a communication interface for a wireless or wired communication system. In the exemplary configuration of FIG. 1, there is shown a wireless interface to a set-top box 14. The UE 16 and/or STB 14 may also have other communication interfaces, including but not limited to cellular communication system including 3G, 46 LTE, and 5G, WiFi, LAN, WiLan or any other communication system compatible with the UE 16 and/or STB 14.

The functionality included in the disclosure may reside either or the user equipment 16 or the application server 18 or a combination thereof. Such designation of functionality between the UE 16 and application server 18 may be a design choice or based on user experience, performance, cost, or any other factor. The allocation of functionality between UE 16 and application server 18 is exemplary only and non-limiting in scope of the present disclosure.

Figure 2:
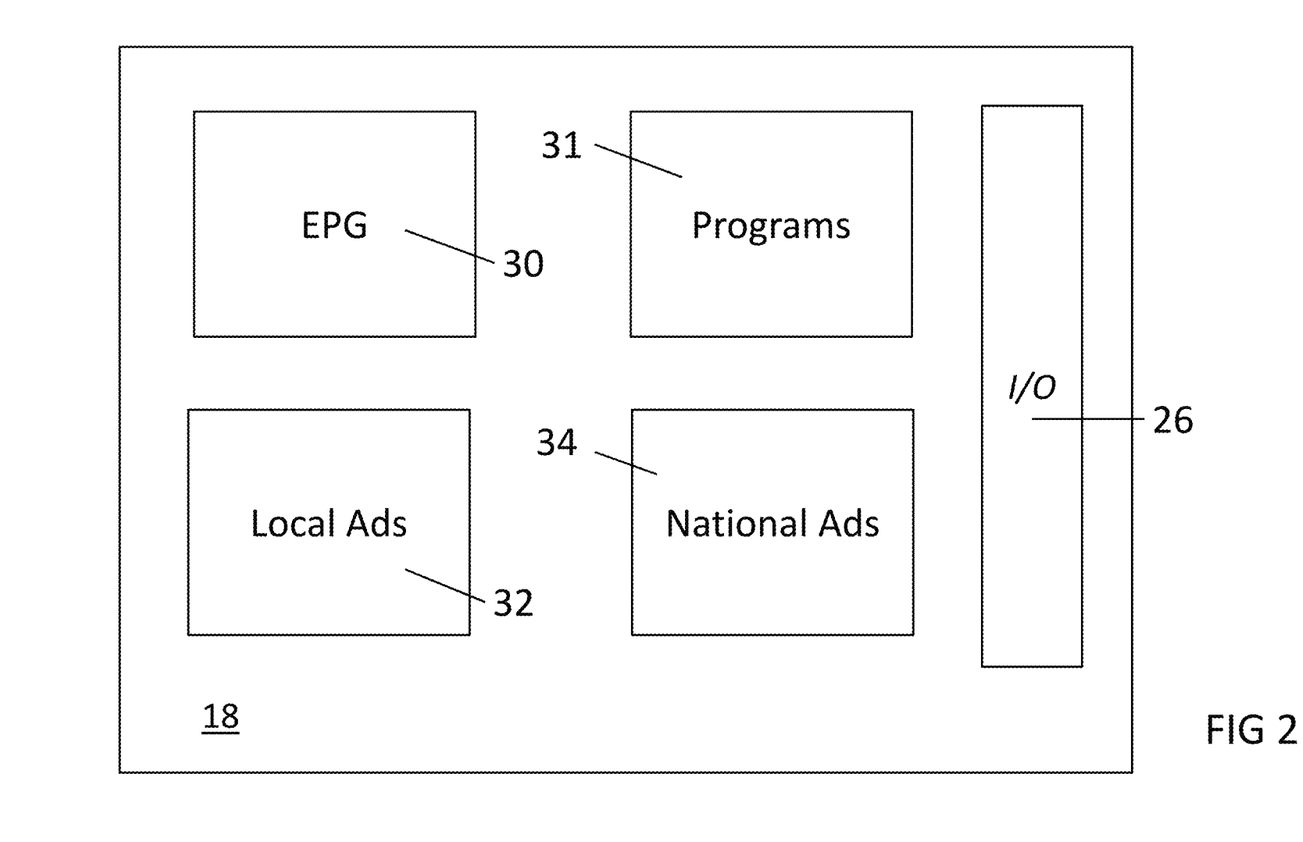
FIG. 2 is a functional block diagram of an exemplary system in which methods and systems to capture event data may be implemented.

Illustrated in FIG. 2, there is shown an exemplary functional block diagram of a server 18. The server 18 may include an input/output port 26 for communication with other devices including the STB 14. The server 18 may also include an electronic program guide (EPG) 30. The EPG 30 may include upcoming program listings, which may, for example include sports programming, movies or other content scheduled in the next two weeks. The server 18 may also include storage of programs 31, either temporarily or permanent, which may be provided to viewers to watch on demand or pay-per-view. Local ads 32 and national ads 34 may also be included and stored in server 18. It will be understood that the configuration of server 18 is exemplary only and any or all of the functions may be distributed among multiple servers or computer networks.

Process Flow.

Figure 3A:
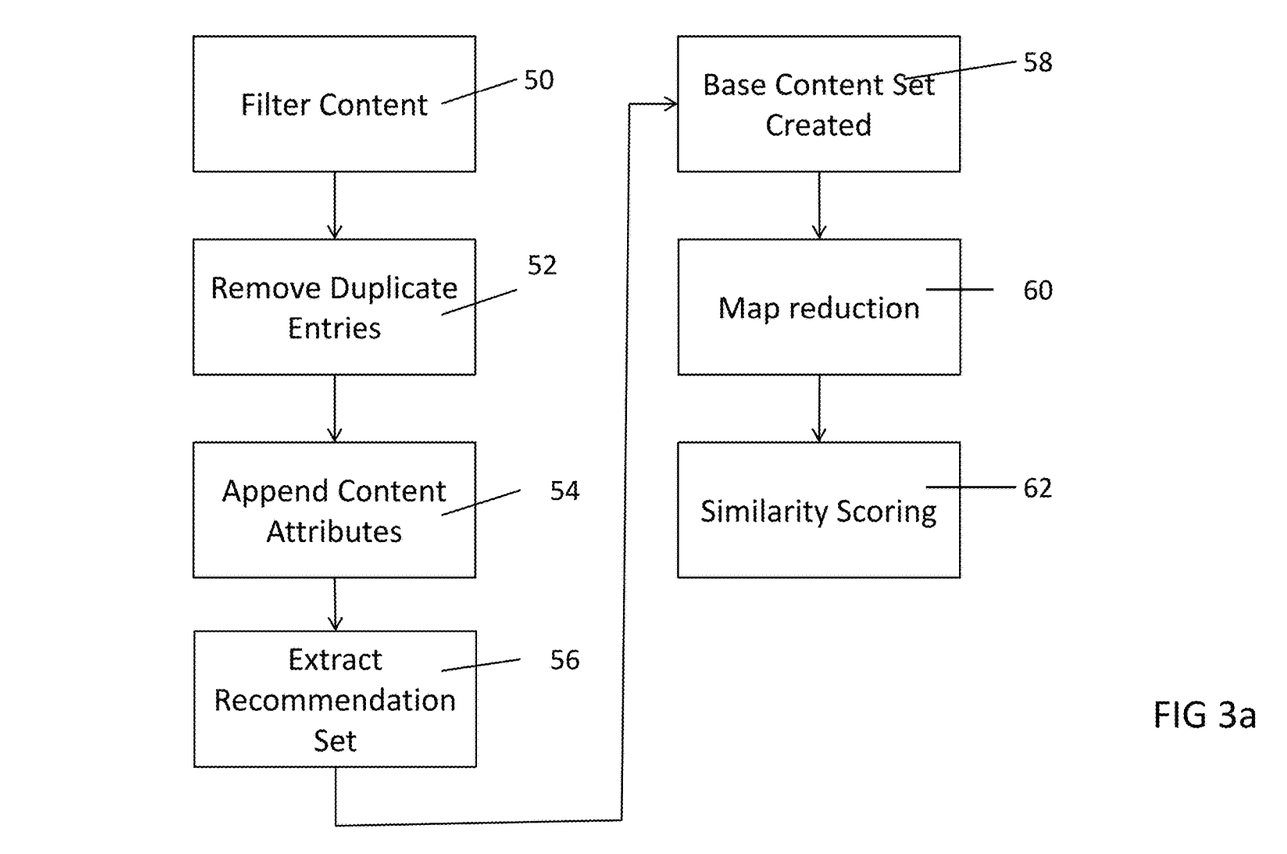
FIG. 3a is an exemplary process flow of a method of operation in accordance with the present disclosure.

With reference to FIG. 3a, there is shown an exemplary process flow diagram which includes the preprocessing of a content database. At 50, the content in the BCS database is filtered. The filtering may, for example, be designed to filter trivial content that cannot be recommended in accordance with the various recommendation algorithms. This content may, for example, include previews, specials, extras and the like. Additionally, the filtering may be designed to filter by genres, for example, news, weather, local programming, movies, sports and the like. At 52, duplicate entries from the filtered database are removed. These entries may be duplicates because some programs are repeated during the relevant time period. At 54, metadata is appended as attributes to content records. For example, the attributes may include the most recent air date of a program, an age recommendation, or a MPAA movie rating. It will be understood that other content record attributes may be appended to each content record. These content records, once filtered and relevant attributes are appended as metadata, may form the recommendation set at 56. Further processing of the recommendation set may, for example, include normalizing the content metadata fields so that content such as current syndicated shows will be afforded greater weight than for shows no longer running.

At 58, a Base Content Set (BCS) is created and comprised of content available that was recently consumed or otherwise may be known by the user or will be available in the near future or through other consumption channels. The BCS may alternatively be calculated from seed data highlighting a user's preferences or from historical viewing data. At 60, a recommendation set (RS) is placed in a distributed cache for a mapper in a map-reduce algorithm. Additionally, each line item from the BCS is also used as an input to the mapper and may assist in the efficient scaling of the algorithm based on the number of content records to be processed. At 62, similarity scoring is performed wherein each mapper calculates a similarity score between the record from the BCS as compared to all records included in the RS. As such, the BCS becomes the baseline to which all elements in the RS are compared through the numerical algorithms disclosed herein.

Figure 3B:
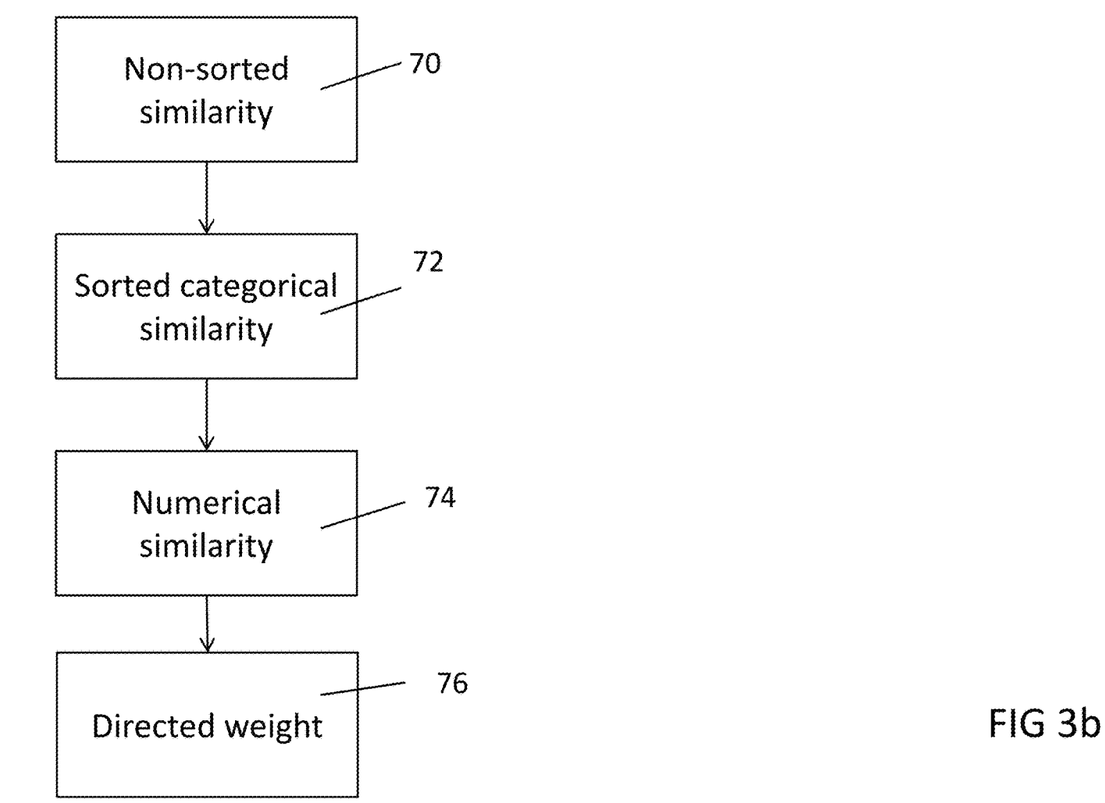

FIG. 3b shows an exemplary flow chart of some of the functionality that may be performed by the similarity scoring at 62. At 70, a non-sorted similarity function, an example of which is specified in more detail below, is performed. At 72, a sorted categorical similarity function, an example of which is specified in more detail below, is performed. At 74, a numerical similarity function, an example of which is specified in more detail below, is performed. At 76, a weighted sum function, an example of which is specified in more detail below, is performed.

Functionality.

There may be various functions employed in calculating the similarity scores, each one building upon the other to achieve an overall recommendation score. In an aspect, the two datasets may be ingested by similarity functions which take as input categorical and numerical data. Scalability issues are addressed by performing all similarity tasks in a map-reduce architecture, where each BCS is loaded to a mapper.

There may be a non-sorted categorical similarity function (examples may be sparse samplings and augmentations of real data) represented by the intersection function:

$$F(x, y) = \frac{x \cap y}{\min(\text{length}(x), \text{length}(y))}$$

wherein x represents attribute entries in the BCS, y represents attributes in the RS, and the lengths represent the number of attributes associated within each category of the RS and BCS. The numerator in the equation would be the number of intersections in the RS and BCS. This similarity function may be useful for certain attributes of the BCS and RS, which in this example, would be mood, character and theme, with three descriptors for each.

Figure 4:
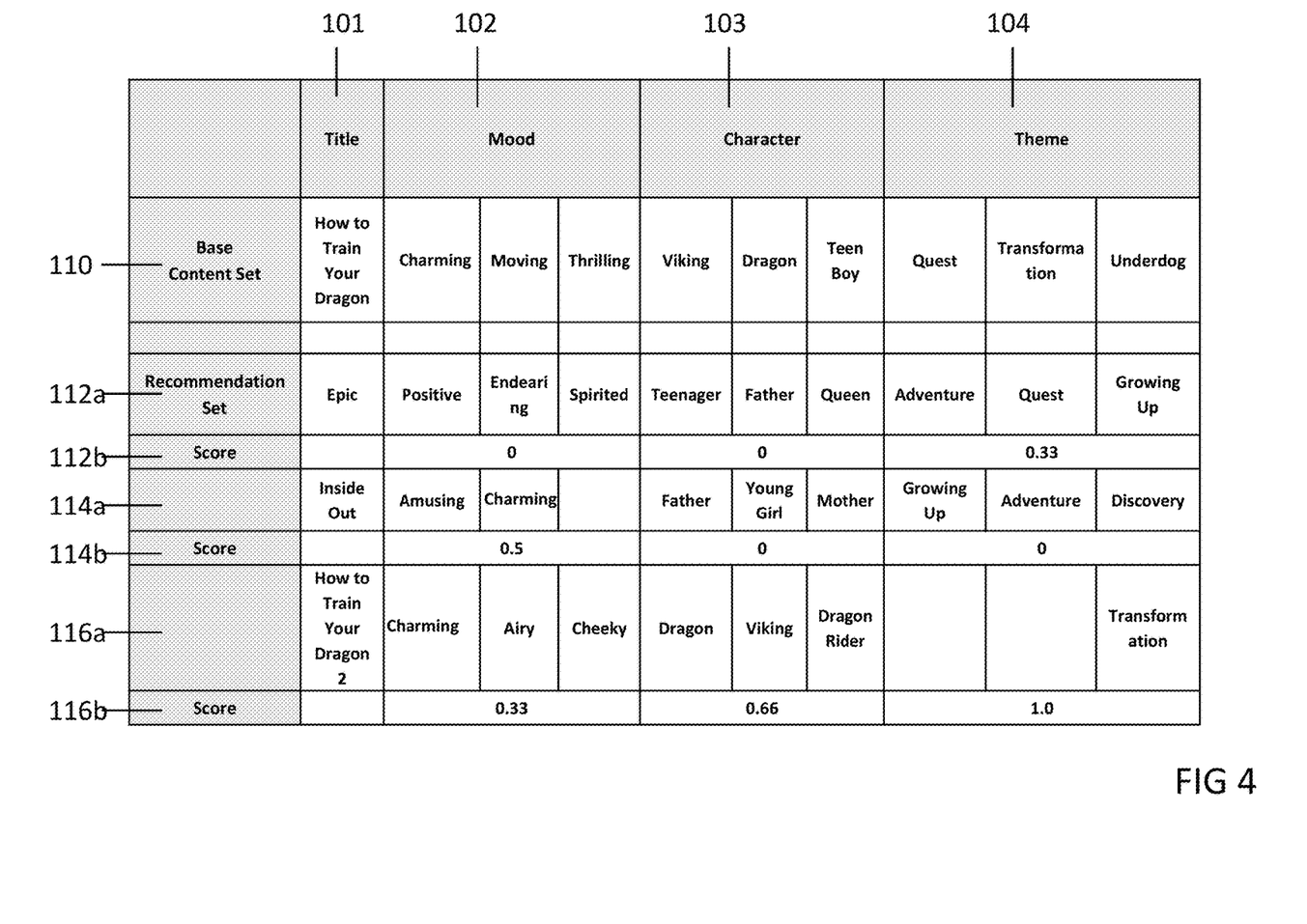
FIG. 4 is an exemplary matrix illustrating the calculations and results of a non-sorted similarity function.

An exemplary application of this functionality is shown in FIG. 4. The base content set is represented by row 110 and includes the title 101, which in this example, is "How to Train Your Dragon", and includes attributes such as mood 102, character 103 and theme 104, each having three characteristics or descriptors. This movie, may for example, be the movie that a parent knows her children liked and is looking for a recommendation that her children will likely want to watch. In this example, the mood 102 field may have three attributes, "charming", "moving" and "thrilling". The character 103 attributes may include "viking", "dragon" and "teen boy". The theme 104 attributes may include "quest", "transformation", and "underdog".

An exemplary recommendation set is represented in FIG. 4 by 112a (the movie "Epic" in column 101), 114a, (the movie "Inside Out" in column 101) and 116a (the movie "How to Train Your Dragon 2" in column 101), each referencing content which may be similar such that a recommendation based on the BCS is warranted. Each member of the recommendation set 112a, 114a and 116a has its own content attributes appended as metadata as shown in columns for mood 102, character 103 and theme 104. In each of the above examples, the length of vectors x and y are each 3 (i.e., 3 attributes per category) defining the denominator and the range of intersection of the BCS and RS for each of the attributes per category forming the numerator.

Applying the intersection function for each of the recommendation sets for each attribute shows that for recommendation set 112a, the respective similarity scores 112b for mood 102, character 103 and theme 104 are 0, 0, and 0.33, respectively. This numerical representation shows no intersection between the base content set and the recommendation set with respect to mood 102 and character 103, and only 33% overlap with respect to theme. Similarly, the similarity scores 114b for recommendation set 114a are 0.5, 0, and 0 for mood 102, character 103 and theme 104, respectively. Finally, the similarity scores 116b for recommendation set 116a are 0.33, 0.66, and 1.0 for mood 102, character 103 and theme 104, respectively. Each of these similarity scores may then be used in the weighted summation calculation set forth below.

Sorted Categorical Similarity Function.

Another which may be employed is the sorted categorical similarity function, represented, by way of example, with the equation below:

$$F(x_i, y_i) = \frac{\sum_{g=\text{metadata}}^{\text{metadata}} \frac{UDF^{|\text{Index}(x_i=g) - \text{Index}(y_j=g)|}}{\text{Index}(x_i=g)+1}}{\sum_{k=1}^{\text{Length}(\text{metadata})} \frac{1}{k}}$$

Figure 5:
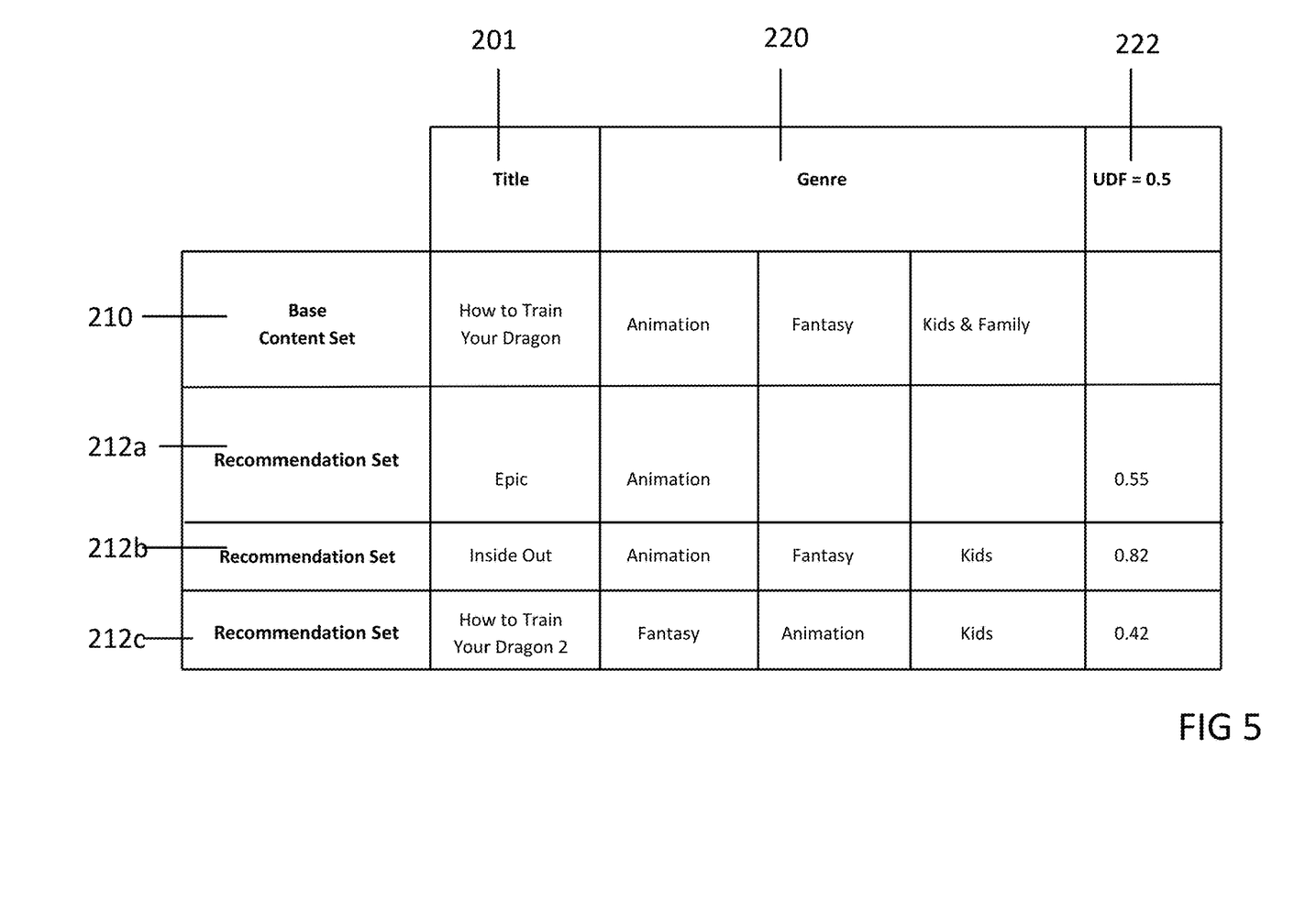
FIG. 5 is an exemplary matrix illustrating the calculations and results of a sorted categorical similarity function.

This function may be useful for determining the similarity score of genre, for example. UDF represents a user defined function which may, for example, be part of a configuration file and not necessarily a user input. The UDF function provides an offset such that an attribute in a data set may be classified as primary, secondary, tertiary, and so forth. With reference to FIG. 5, there is shown a matrix having a BCS 210 comprising the movie title 201 "How to Train Your Dragon." The data points in BCS 210 may, for example, be represented by $x_i$ in the equation above. The genre attributes in the BCS 210 for movie title 201 "How to Train Your Dragon" include "animation" as the primary genre, "fantasy" as the secondary genre, and "kids and family" as the tertiary genre.

Genre attributes for each RS and are represented by $y_i$ in the equation above. The genre attributes are shown in column 220, which in this example, include "Animation", "Fantasy" and "Kids and Family". The three recommendation sets are shown in rows 212a for the movie "Epic" having primary genre attribute 220 of "animation", row 212b for the movie "Inside Out" having having primary, secondary and tertiary genre attributes 220 of "Animation", "Fantasy" and "Kids", respectively, and row 212c for the movie "How to Train Your Dragon 2" having primary, secondary and tertiary genre attributes 220 of "Animation", "Fantasy" and "Kids", respectively. Viewing the matrix shown in FIG. 5, it is clear that the primary and secondary genre attributes of the RS for the movie "Epic" are aligned with the primary and secondary genres of the BCS 210 for the movie "How to Train Your Dragon." This is confirmed by applying the sorted categorical similarity function identified above wherein the highest score is calculate at 0.82. Column 222 shows the calculated score for the sorted categorical similarity function for each of the recommendation sets 212a, 212b, and 212c which are, in this example, 0.55, 0.82, and 0.42, respectively. The higher score will factor into the higher recommendation Numerical Similarity Function.

Another factor which may be employed is the numerical similarity function, represented, by way of example, with the equation below:

$$F(x, y) = e^{-(\frac{x-y}{\sigma})^2}$$

This numerical similarity function may, for example, represent an epoch, that moment in time where an individual may feel the most comfortable or connected. In the context of movie recommendations, the attribute associated with the epoch may be the age recommendation or a particular preference for the year or range of years in which the movie was released. In this equation, $\sigma$ may represent a range of values wherein values within the range are weighted heavier than values outside of the range.

Figure 6:
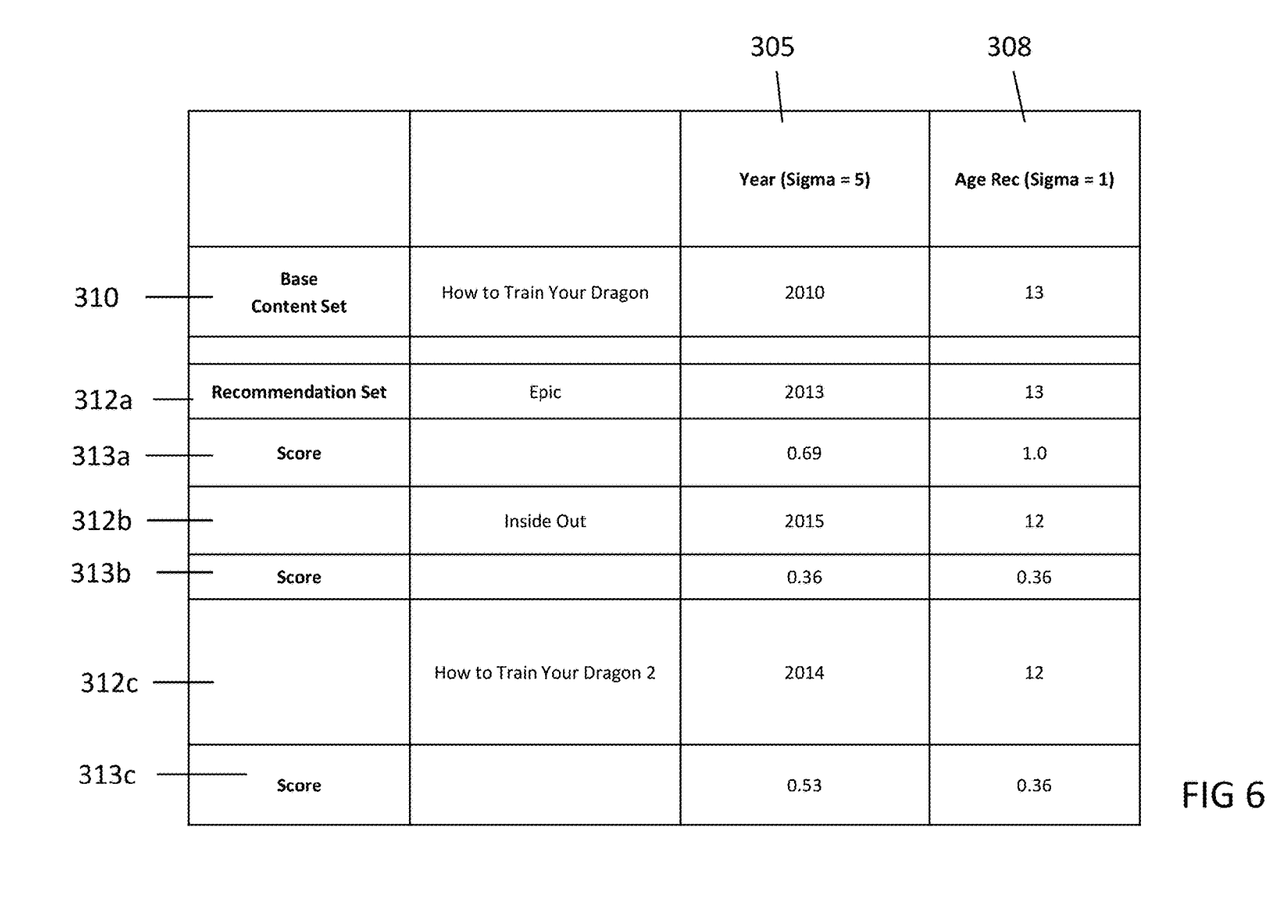
FIG. 6 is an exemplary matrix illustrating the calculations and results of a numerical similarity function.

With reference to FIG. 6, by way of example only, a $\sigma$ of 5 has been assigned to the year that a movie was released and a $\sigma$ of 1 has been assigned to the age recommendation. The BCS 310 for "How to Train Your Dragon" has attributes wherein the movie was released in 2010 and has an age recommendation of 13. The RS 312a for "Epic" has attributes wherein the movie was released in 2013 and has an age recommendation of 13. Applying the numerical similarity function identified above, the similarity scores 313a are calculated at 0.69 for the year the movie was released and 1.0 for the age recommendation. For RS 312b for the movie "Inside Out" released in 2015 and targeted age 12, the similarity scores for each was 0.36 and 0.36 for both the year of release and the age recommendation as shown in 312b. For RS 312c for the movie "How to Train Your Dragon 2", the similarity scores shown by 313c in FIG. 6 are 0.53 and 0.36 for the year of release and the age recommendation, respectively. The higher score will correlate to a higher recommendation score.

Weighting Function.

Having performed the above-referenced calculations, the results of the correlations functions may be added together in accordance with the following:

$$\text{DirectedWeight}(\vec{x}, \vec{w}) = \Sigma_{i=1}^{MetadataFields} x_i w_i$$

In an aspect, the results of the correlation functions may be weighted so as to emphasize certain attributes over others. For example, a weighting function may place more emphasis on genre or alternatively, may place more emphasis on the age recommendation.

Figure 7:
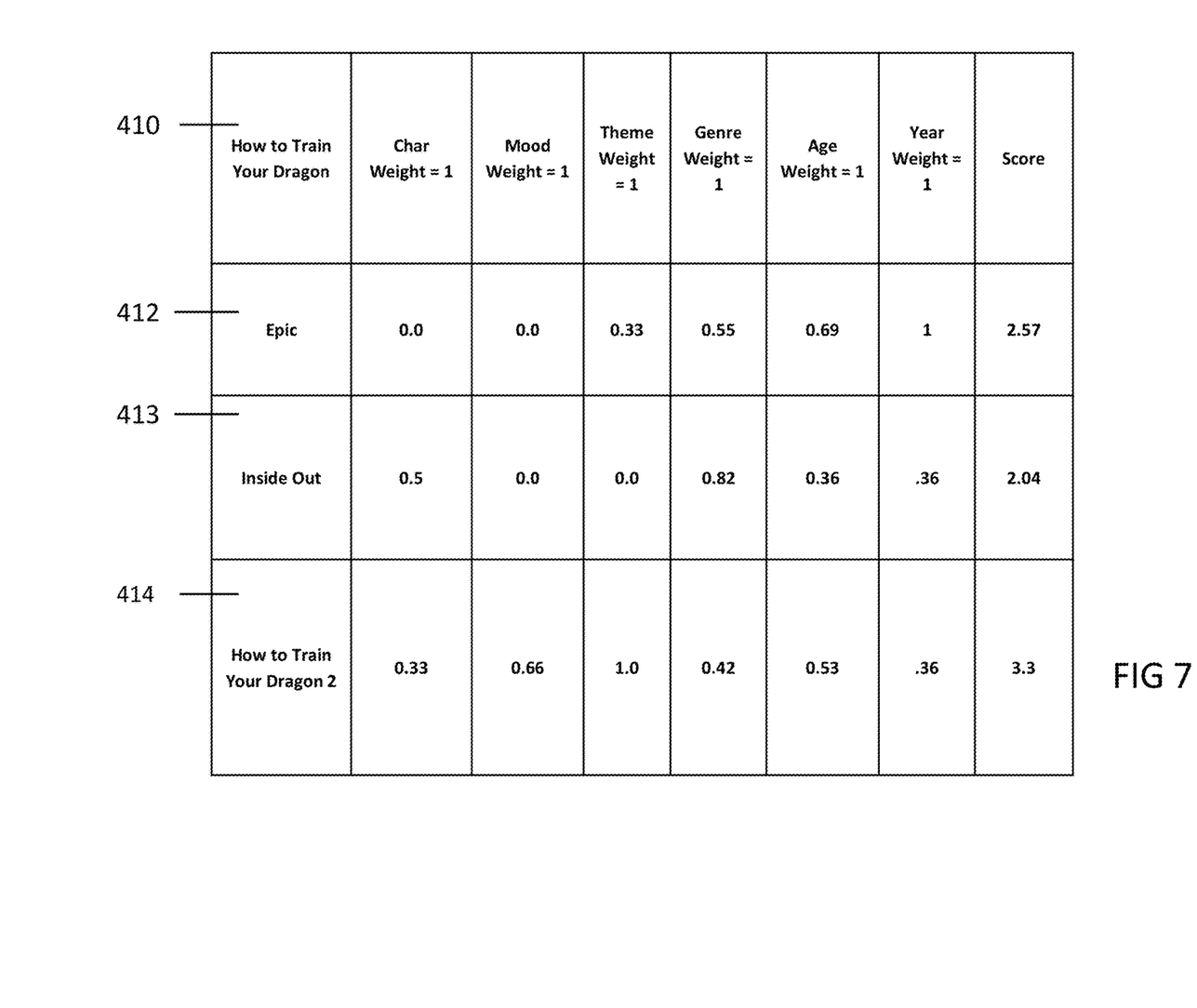
FIG. 7 is an exemplary matrix illustrating the calculations and results of a directed weight summation function.

In the present example and as shown in FIG. 7, the results of the various correlation functions are equally weighted. At 410, the attributes for the BCS are set equal to "1", those attributes being character, mood, theme, genre, age, and release year. At 412, each of the data points for the RS for "Epic" are set forth. With the weights of each attribute equal to "1", the results are summed together to achieve a recommendation score of "2.57". At 414 each of the data points for the RS for "Inside Out" are set forth. With the weights of each attribute equal to "1", the results are summed together to achieve a recommendation score of "2.04". At 416, each of the data points for the RS for "How to Train Your Dragon 2" are set forth. With the weights of each attribute equal to "1", the results are summed together to achieve a recommendation score of "3.3". As such, in an aspect in which the recommendations would be ranked, "How to Train Your Dragon 2" would be the first recommendation, "Epic" would be the second recommendation, and "Inside Out" would be the third recommendation. It will be evident to those skilled in the art that various weights may be applied to highlight certain attributes over others.

In operation, a user may enter a movie title with a request for the top three recommendations. The calculations may be performed using default values, or the user may specify particular attributes that may be more important. For example, the user may specify a desire to match the genre, i.e., a western, as the most important attribute. That input would affect the weighting of the final summation calculation. In an aspect, the user may specify a wider release year which would result in a higher $\sigma$ being used in the numerical similarity function. The user may enter these parameters on a per use basis, or may create a user profile that would serve as a default for all recommendations.

In an aspect, there may be a database comprising historical content selections by the user. There may be a "typical" base content set built based on past user selections to use in evaluation. For example, a base content set for a user may comprise a genre of "comedy", with an emphasis on classic comedy for films released in the 1970's. Another user may have a default base content set comprising a genre of mystery with release dates within the past 2 years. The user base content set may be compiled through the use of algorithms operating on the historical viewing data.

The algorithmic approach for the fusion of the model outputs is a summation of weighted unit normalized measures. This allows a natural binning of results based on the number of available metadata available, and then sorting per bin which can be augmented through weighting. This compartmentalized approach decreases cognitive load on the analyst as the data and their influence can be immediately detected. The result of the above is a graph of BCS with weighted direction to RS.

The algorithm described herein allows the system to generate a content graph efficiently for a variably sized and otherwise inconsistent content database. The graph may be used in recommendations such as the content based system as well as a similarity backend service for downstream analytics. For the purposes of curation, when a list is not populated as one desires, it can be backfilled from the aggregation of the similarity of content present. The algorithm allows the recommendation of web content which has sparse data.

There may be variations of the above described system and methods that fall within the scope of the present disclosure and appended claims. For example, if the similarity calculations are below a certain threshold, the upcoming program may not be recommended, even if there are additional entries available for the display. In this manner, the relative rankings of programs may still be performed, but the actual value of the comparison may also be used as a factor in the recommendation.

Likewise, the disclosure may be applicable for a particular account, i.e., a household. Additionally, the household account may be subdivided into individual user accounts, with the individual user's historical viewing habits used in the calculations as the base content set. In this way, a wife may prefer a movie genre based on films set in West Virginia while the husband may prefer to watch fantasy. Selecting a movie based on the most recently viewed movie as the BCS may then be used for each. By segregating into individual user accounts, the recommendation system and method would be tailored for each.

Although not every conceivable combination of components and methodologies for the purposes describing the present disclosure have been set out above, the examples provided will be sufficient to enable one of ordinary skill in the art to recognize the many combinations and permutations possible in respect of the present disclosure. Accordingly, this disclosure is intended to embrace all such alterations, modifications and variations that fall within the spirit and scope of the appended claims. In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

While example embodiments have been described in connection with various computing devices/processors, the underlying concepts can be applied to any computing device, processor, or system capable of performing the processing as described herein. The methods and apparatuses of the present disclosure, or certain aspects or portions thereof, can take the form of program code (i.e., instructions) embodied in tangible storage media having a physical structure, such as floppy diskettes, CD-ROMs, hard drives, or any other machine-readable storage medium having a physical tangible structure (computer-readable storage medium), wherein, when the program code is loaded into and executed by a machine, such as a computer, the machine becomes an apparatus for distributing connectivity and/or transmission time. A computer-readable storage medium, as described herein is an article of manufacture, and thus, is not to be construed as a transitory signal. In the case of program code execution on programmable computers, which may, for example, include server 40, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems of the present disclosure may be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, a controller, or the like, the machine becomes an apparatus for use in reconfiguration of systems constructed in accordance with the present disclosure. When implemented on a general-purpose processor, the program code combines with the processor to provide a unique apparatus that operates to invoke the functionality described herein.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed:

1. A method comprising:
creating a base content set having attributes indicative of a first program;
selecting a second program to form a first recommendation set;
determining a first similarity score between the base content set and the first recommendation set, and
providing a recommendation based on the similarity score, wherein the determining step comprises:
performing a non-sorted similarity function to obtain a first interim similarity score;
performing a sorted categorical similarity function to obtain a second interim similarity score; and
performing a numerical similarity function to obtain a third interim similarity score and wherein each of the first interim similarity score, the second interim similarity score and the third interim similarity score are assigned a weight and the recommendation is based on the weighted sum of the first interim similarity score, the second interim similarity score and the third interim similarity score.

2. The method of claim 1 further comprising:
selecting a third program to form a second recommendation set;
determining a second similarity score between the base content set and the second recommendation set; and
ranking the first recommendation set and the second recommendation set based on the first similarity score and the second similarity score.

3. An apparatus comprising:
an communications interface;
a processor coupled to the communications interface and wherein the processor is coupled to a memory, the memory having stored thereon executable instructions that when executed by the processor cause the processor to effectuate operations comprising:
creating a base content set having attributes indicative of a first program;
selecting a second program to form a first recommendation set;
determining a first similarity score between the base content set and the first recommendation set; and providing a recommendation based on the similarity score; wherein the determining step comprises:

performing a non-sorted similarity function to obtain a first interim similarity score:

performing a sorted categorical similarity function to obtain a second interim similarity score: and performing a numerical similarity function to obtain a third interim similarity score and wherein each of the first interim similarity score, the second interim similarity score and the third interim similarity score are assigned a weight and the recommendation is based on the weighted sum of the first interim similarity score, the second interim similarity score and the third interim similarity score.

4. The apparatus of claim 3 wherein the operations further comprise:

selecting a third program to form a second recommendation set;

determining a second similarity score between the base content set and the second recommendation set; and ranking the first recommendation set and the second recommendation set based on the first similarity score and the second similarity score.

\* \* \* \* \*